US012722190B2

(12) United States Patent
Chiu et al.

(10) Patent No.: US 12,722,190 B2
(45) Date of Patent: Sep. 1, 2026

(54) DRY CLEANING DEVICE AND DRY CLEANING METHOD

(71) Applicant: GUDENG PRECISION INDUSTRIAL CO., LTD., New Taipei City (TW)

(72) Inventors: Ming-Chien Chiu, New Taipei City (TW); Chia-Ho Chuang, New Taipei City (TW); Hsin-Min Hsueh, New Taipei City (TW); Yen-Cheng Tu, New Taipei City (TW)

(73) Assignee: GUDENG PRECISION INDUSTRIAL CO., LTD., New Taipei City (TW)

( * ) Notice: Subject to any disclaimer, the term of this patent is extended or adjusted under 35 U.S.C. 154(b) by 15 days.

(21) Appl. No.: 18/791,445

(22) Filed: Aug. 1, 2024

(65) Prior Publication Data

US 2025/0065380 A1 Feb. 27, 2025

Related U.S. Application Data

(60) Provisional application No. 63/578,667, filed on Aug. 25, 2023.

(51) Int. Cl.
*B08B 7/00* (2006.01)
*B08B 9/28* (2006.01)
(Continued)

(52) U.S. Cl.
CPC .................. *B08B 7/00* (2013.01); *B08B 9/28* (2013.01); *B08B 9/46* (2013.01); *B24C 1/003* (2013.01);
(Continued)

(58) Field of Classification Search
CPC .......... B24C 1/003; B24C 1/22; B24C 1/086; B24C 1/083; B24C 3/32; B24C 3/322;
(Continued)

(56) References Cited

U.S. PATENT DOCUMENTS 5,123,207 A * 6/1992 Gillis, Jr. .................. B24C 9/00 451/92
8,924,019 B2 * 12/2014 Tang ..................... A47L 9/2852 382/103

(Continued)

FOREIGN PATENT DOCUMENTS

JP 2007184524 A * 7/2007 ....... H01L 21/67034

OTHER PUBLICATIONS

JP-2007184524-A English Translation (Year: 2007).*

*Primary Examiner* — Makena S Markman

(57) ABSTRACT

A dry cleaning device adapted to clean a container component of a container of a semiconductor manufacturing process and adapted to clean the container component by carbon dioxide snowflakes. The dry cleaning device can first inspect the container component before and after cleaning, clean the container component by carbon dioxide snowflakes according to a predetermined cleaning working set, and forwards the container component to a next workstation once the cleaning of the container component is complete. The dry cleaning device is adapted to clean a container of a semiconductor manufacturing process in a fast and effective manner without involving any liquid solvents.

13 Claims, 10 Drawing Sheets

(51) Int. Cl.
*B08B 9/46* (2006.01)
*B24C 1/00* (2006.01)
*B24C 3/32* (2006.01)
*B24C 9/00* (2006.01)

(52) U.S. Cl.
CPC .............. *B24C 3/322* (2013.01); *B24C 3/325* (2013.01); *B24C 9/00* (2013.01); *B08B 2209/08* (2013.01)

(58) Field of Classification Search
CPC ......... B24C 3/325; B24C 9/00; B08B 9/0813; B08B 9/46; B08B 2209/08
USPC ...................................... 451/38, 39; 134/7, 8
See application file for complete search history.

(56) References Cited

U.S. PATENT DOCUMENTS

| | | | | |
|---|---|---|---|---|
| 2020/0294834 | A1* | 9/2020 | Houng | B24C 1/003 |
| 2024/0009856 | A1* | 1/2024 | Brand | B25J 5/007 |
| 2024/0379345 | A1* | 11/2024 | Hwang | H10P 70/70 |
| 2026/0004258 | A1* | 1/2026 | Kim | G06Q 10/20 |

* cited by examiner

DRY CLEANING DEVICE AND DRY CLEANING METHOD

CROSS-REFERENCE TO RELATED APPLICATION

This non-provisional application claims priority under 35 U.S.C. § 119 (e) on U.S. provisional Patent Application No. 63/578,667 filed on Aug. 25, 2023, the entire contents of which are hereby incorporated by reference.

BACKGROUND OF THE INVENTION

1. Field of the Invention

The present disclosure relates to a dry cleaning device and a dry cleaning method, and in particular to a dry cleaning device and a dry cleaning method for cleaning an element or a container.

2. Description of the Related Art

For semiconductor containers commonly used for protecting, storing, and transporting semiconductor workpieces in the semiconductor industry, interiors of a container of a semiconductor manufacturing process can become contaminated due to various factors such as manufacturing processes and environments and thus need cleaning. The semiconductor workpieces can be pieces of wafer, masks, printed circuit boards (PCBs), carrier boards, or other electronic components, and the containers of a semiconductor manufacturing process can be wafer carrier pods, mask carrier pods, PCB carrier pods, or other electronic component carrier pods. A container of a semiconductor manufacturing process is provided therein with electronic components, which operate in conjunction with the semiconductor workpieces and may become contaminated due to factors such as frequent contact with semiconductor workpieces, ambient environmental dust, and vaporization of gas during the manufacturing process. On the outside of a container of a semiconductor manufacturing process, there are components for coordinating with automated production lines or applications with machines, and cross-contamination of components within the container or semiconductor workpieces may also be resulted due to contamination outside the containers. Currently available cleaning means for semiconductor containers and components thereof mostly use liquid solvents for cleaning. Besides the use of a large amount of liquid solvents during a washing process, additional drying and baking processes need to be performed after the washing process, so as to remove residual solvents of the washing process.

However, owing to special structural designs, components inside a container of a semiconductor manufacturing process can be more easily attached with contaminants, and thus require multiple times of washing, drying, and baking processes. Such cleaning means consumes a greater amount of liquid solvents as well as drying and baking of an extended period of time. Therefore, it is important to provide a fast and effective dry cleaning device or method free from the use of liquid solvents, so as to meet cleaning requirements of a large quantity of containers of a semiconductor manufacturing process and to reduce the use of liquid solvents and manufacturing process operation time.

BRIEF SUMMARY OF THE INVENTION

In view of the above, a dry cleaning device and a dry cleaning method provided by the present disclosure are capable of effectively providing an appropriate washing process with respect to different contamination types, without cleaning that involves liquid solvents or additional time consumption.

A dry cleaning device provided according to an aspect of the present disclosure is adapted to clean a container component of a container of a semiconductor manufacturing process. The dry cleaning device includes: a dry cleaning module, adapted to clean the container component by carbon dioxide snowflakes; an inspection module, adapted to inspect the container component to obtain an inspection result; a storage module, adapted to store the container component and a corresponding cleaning working set; and a programmable logic controller (PLC), signally connected to the dry cleaning module, the inspection module, and the storage module. The PLC is adapted to perform steps of: cleaning the container component by carbon dioxide snowflakes by the dry cleaning module according to the cleaning working set; inspecting the container component by the inspection module before the cleaning and after the cleaning to obtain an inspection result; determining a component type of the container component according to the inspection result before the cleaning, selecting a predetermined cleaning procedure corresponding to the component type from the cleaning working set according to the component type, and cleaning the container component using carbon dioxide snowflakes by the dry cleaning module according to the predetermined cleaning procedure; determining, according to the inspection result after the cleaning, whether the cleaning of the container component is complete, and generating a determination result; and selecting a subsequent cleaning procedure corresponding to the inspection result from the cleaning working set according to the determination result, and cleaning the container component by carbon dioxide snowflakes by the dry cleaning module according to the subsequent cleaning procedure, or forwarding the container component to a next workstation.

In the dry cleaning device above, the dry cleaning module includes: a cavity; a cleaning carrier platform, disposed in the cavity, the cleaning carrier platform adapted to hold the container component; a filter, disposed in the cavity, the filter adapted to filter a gas for a clean gas to flow into the cavity; and a dry cleaning nozzle, disposed in the cavity, the dry cleaning nozzle spraying carbon dioxide snowflakes to the container component according to the cleaning working set.

In the dry cleaning device above, a plurality of dry cleaning nozzles is provided, the plurality of dry cleaning nozzles are arranged at different positions in the cavity, and the dry cleaning nozzles can be controlled to rotate in different directions to clean the container component.

In the dry cleaning device above, the dry cleaning module further includes a cleaning movement module, and the PLC controls the cleaning movement module to adjust a relative position relationship between the dry cleaning nozzle and the container component.

In the dry cleaning device above, the inspection module includes: an inspection carrier platform, adapted to carry the container component; an inspection lens, adapted to inspect the container component; and an inspection analyzer, for analyzing a condition of the container component after the inspecting to accordingly obtain the inspection result.

In the dry cleaning device above, the inspection module further includes an inspection movement module, and the PLC controls the inspection movement module to adjust a relative position relationship between the inspection lens and the container component.

In the dry cleaning device above, the PLC divides a region of the container component into a mesh pattern according to the inspection result before the cleaning and after the cleaning, and labels a contamination type.

In the dry cleaning device above, the PLC determines whether the cleaning is complete by comparing a defective substance quantity within a unit area in the inspection result after the cleaning with a predetermined inspection standard.

In the dry cleaning device above, the PLC obtains the subsequent cleaning procedure for strengthening regional cleaning from the cleaning working set according to the inspection result after the cleaning.

In the dry cleaning device above, the storage module has multiple component types of the container component and contamination types, predetermined cleaning procedures and subsequent cleaning procedures in the corresponding cleaning working set stored therein; the PLC determines the component type and the contamination type according to the inspection result before the cleaning or after the cleaning, and selects the predetermined cleaning procedure or subsequent cleaning procedure corresponding to the contamination type.

In the dry cleaning device above, the PLC provides feedback and adjusts the cleaning working set in the storage module according to the inspection result, wherein the cleaning working set includes the predetermined cleaning procedure and the subsequent cleaning procedure.

In the dry cleaning device above, the PLC further includes an artificial intelligence (AI) determination engine for adjusting the cleaning working set in the storage module according to the inspection result.

In the dry cleaning device above, the inspection module further includes an AI inspection engine, and the inspection result is obtained by processing by the AI inspection engine.

A dry cleaning method provided according to an aspect of the present disclosure is adapted to clean a container of a semiconductor manufacturing process and a container component thereof. The dry cleaning method includes: inspecting a component type of the container component before cleaning; selecting a predetermined cleaning procedure corresponding to the component type from a cleaning working set according to the component type; cleaning the container component using carbon dioxide snowflakes according to the predetermined cleaning procedure; inspecting a cleaning condition of the container component after the cleaning to obtain an inspection result; determining, according to the inspection result, whether the cleaning of the container component is complete, and generating a determination result; according to the determination result, if the cleaning of the container component is not complete, selecting a subsequent cleaning procedure corresponding to the inspection result from the cleaning working set, and again cleaning the container component using carbon dioxide snowflakes until the cleaning of the container component is complete, and if the cleaning of the container component is complete, forwarding the container component to a next workstation.

In the dry cleaning method above, the determining of whether the cleaning of the container component is complete includes dividing a region of the container component into a mesh pattern by an AI inspection engine, labeling a defective substance quantity of the region, and comparing the defective substance quantity with a predetermined inspection standard to accordingly generate the determination result.

In the dry cleaning method above, before the inspecting of the component type of the container component before the cleaning, further includes: storing multiple component types of the container component and contamination types, predetermined cleaning procedures and subsequent cleaning procedures in the corresponding cleaning working set.

In the dry cleaning method above, the inspecting of the container component before the cleaning and after the cleaning includes determining the component type and the contamination type by a programmable logic controller (PLC) according to the inspection result before the cleaning and after the cleaning, and selecting the predetermined cleaning procedure or the subsequent cleaning procedure corresponding to the contamination type.

The dry cleaning method above is performed by a dry cleaning device. The dry cleaning device includes a dry cleaning module, an inspection module, a storage module and a programmable logic controller (PLC). The dry cleaning module cleans the container component using carbon dioxide snowflakes. The inspection module inspects the container component to obtain an inspection result. The storage module stores the container component and a corresponding cleaning working set. The PLC is signally connected to the dry cleaning module, the inspection module, and the storage module, and is used for performing the dry cleaning method.

With the drying cleaning device and drying cleaning method of the present disclosure, a fast and effective dry cleaning device and method free from the use of liquid solvents can be implemented, so as to meet cleaning requirements of a large amount of containers of a semiconductor manufacturing process and to reduce the use of liquid solvents and manufacturing process operation time. With the drying cleaning device and drying cleaning method of the present disclosure, since liquid solvents are not needed, the use of a large amount of deionized (DI) water can be eliminated so that a large amount of waste water is not produced. Moreover, compared with a conventional washing process that requires steps of washing, drying, and baking, the dry cleaning device and dry cleaning method of the present disclosure involves only the step of dry cleaning. In addition to saving manufacturing process time, material and part costs of the cleaning device are also reduced, hence further enhancing effects and quality of the necessary container washing process in semiconductor manufacturing processes.

DETAILED DESCRIPTION OF THE INVENTION

The technical contents of the present disclosure are to be further described in detail by way of embodiments with the accompanying drawings below. It should be noted that, in the present disclosure, terms such as "first", "second", and "third" are used to distinguish differences among elements, and are not to be construed as limitations to the elements themselves or specific order of the elements. Moreover, in the present disclosure, if a specific number is not specified, the article "a/an/one" refers to one element or more.

To fully understand the objects, features, and effects of the present disclosure, the present disclosure is described in detail by way specific embodiments with the accompanying drawings.

A dry cleaning device adapted to clean a container of a semiconductor manufacturing process and a component thereof is disclosed according to an aspect of the present disclosure. The dry cleaning device is for cleaning, for example but not limited to, a wafer carrier pod, a mask carrier pod, a carrier board carrier pod, or a container of other elements of a semiconductor manufacturing process, and a housing, a support member, a limiter, a door panel, or a tray of a container.

Figure 1:
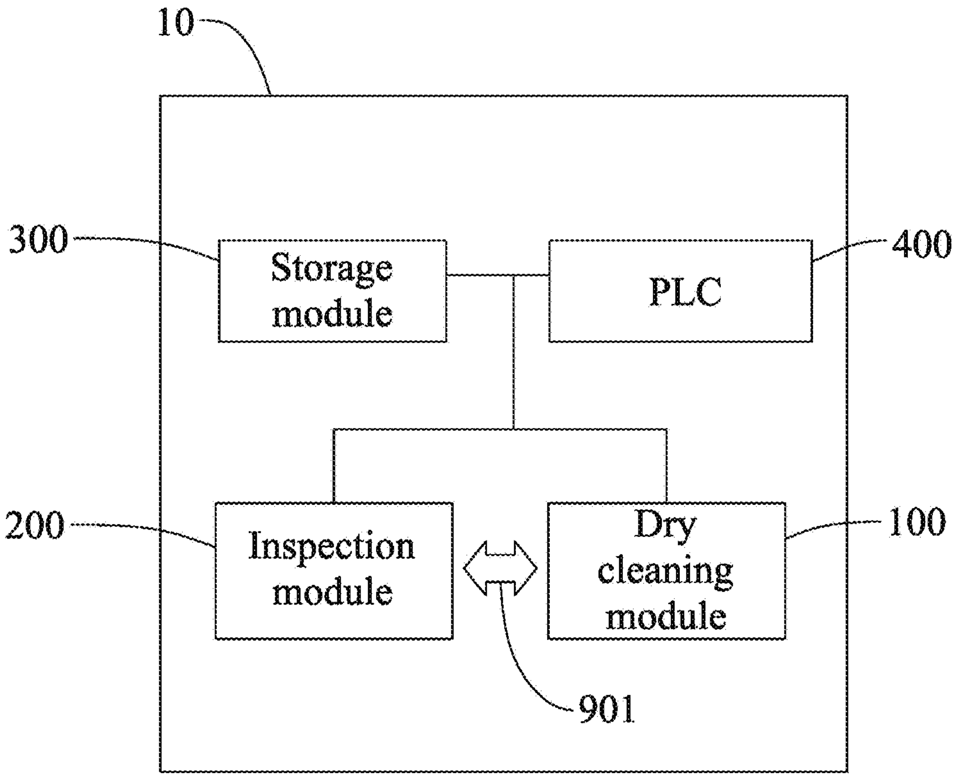
FIG. 1 is a block schematic diagram of a dry cleaning device according to an embodiment of the present disclosure.

FIG. 1 shows a block schematic diagram of a dry cleaning device according to an embodiment of the present disclosure. Referring to FIG. 1, a dry cleaning device 10 includes a dry cleaning module 100, an inspection module 200, a storage module 300, and a programmable logic controller (PLC) 400. The PLC 400 is signally connected to the dry cleaning module 100, the inspection module 200, and the storage module 300.

The dry cleaning module 100 is adapted to clean a container of a semiconductor manufacturing process and/or a container component thereof using carbon dioxide snowflakes. The inspection module 200 is adapted to inspect the container component to obtain an inspection result. In an embodiment of the present disclosure, the inspection result can include such as component type inspection, appearance inspection, type and size inspection of a cleaning target, and number, type and region inspection of contamination. The arrows in FIG. 1 represent a transmission path 901 of a container of a semiconductor manufacturing process and/or a container component thereof. In an embodiment of the present disclosure, the inspection is performed by means of optical or image detection. The storage module 300 is adapted to store a cleaning working set of washing process and cleaning procedure combinations corresponding to different containers and different container components, that is, the cleaning working set stored in the storage module 300 includes multiple cleaning tasks to be performed, so as to correspond to cleaning conditions corresponding to all types of parts such as container housings, support members, limiters, and door panels. The cleaning conditions include items such as, for example but not limited to, a cleaning mode, and a predetermined value satisfying a cleaning condition, such as a cleaning time, strength, and region. In an embodiment of the present disclosure, the cleaning working set includes a predetermined cleaning procedure and a subsequent cleaning procedure. Various cleaning procedures in the cleaning working set can have different categories and sub-washing processes according to different containers and container components, the predetermined cleaning procedure can refer to a cleaning procedure when a component to be cleaned is cleaned for the first time, and the subsequent cleaning procedure can refer to a cleaning procedure of further strengthened cleaning according to an inspection result, wherein these cleaning procedures can be substantially the same or different.

In an embodiment of the present disclosure, the cleaning working set includes a plurality of cleaning procedures to correspond to different container types.

In an embodiment of the present disclosure, a plurality of subsequent cleaning procedures is provided so as to correspond to cleaning requirements after different inspections.

In an embodiment of the present disclosure, the storage module 300 stores multiple component types of the container component and corresponding contamination types, predetermined cleaning procedures, and subsequent cleaning procedures in the corresponding cleaning working set.

In an embodiment of the present disclosure, the storage module 300 is a storage medium such as a database, a hard drive, a memory, a memory card, cloud, a server, a workstation or an Internet electronic device.

The PLC 400 is adapted to perform steps of: cleaning the container component with carbon dioxide snowflakes by the dry cleaning module 100 according to the cleaning working set; inspecting the container component by the inspection module 200 before the cleaning and after the cleaning to obtain an inspection result; determining a component type of the container component according to the inspection result, selecting a predetermined cleaning procedure corresponding to the component type from the cleaning working set according to the component type, and cleaning the container component with carbon dioxide snowflakes by the dry cleaning module 100 according to the predetermined cleaning procedure; determining, according to the inspection result, whether the cleaning of the container component is complete, and generating a determination result; and selecting a subsequent cleaning procedure corresponding to the inspection result from the cleaning working set according to the determination result, and cleaning the container component by carbon dioxide snowflakes by the dry cleaning module 100 according to the subsequent cleaning procedure, or forwarding the container component to a next workstation. In the step of the determining of a subsequent procedure according to the determination result, based on the determination result, if it is determined that the cleaning is not complete, the cleaning is again strengthened, and a cleaning procedure corresponding to the inspection result is selected. For example, the corresponding subsequent cleaning procedure again performs the cleaning procedure, and if it is determined according to the determination result that the cleaning is complete, a next workstation, for example, other procedures or manufacturing processes, is executed.

In an embodiment of the present disclosure, the inspection result includes, for example but not limited to, such as appearance inspection, type and size inspection of a cleaning target, and number and region inspection of contamination.

For example, before the cleaning, the inspection module 200 can inspect the container component to determine the type of the container and the type of the component for the container component, and the PLC 400 can accordingly select the predetermined cleaning procedure of the corresponding type of the container component, and control the dry cleaning module 100 to perform the cleaning according to the predetermined cleaning procedure. Moreover, the inspection module 200 can also inspect a result of the container component after the cleaning to inspect a cleaning result thereof, further determine whether the cleaning yields a good cleaning result or whether there is any contamination type or region that needs further strengthening, and accordingly select the corresponding subsequent cleaning procedure by the PLC 400 for further strengthened cleaning. That is, the PLC 400 determines the component type and the contamination type thereof according to the inspection result before the cleaning or after the cleaning, and selects the predetermined cleaning procedure or the subsequent cleaning procedure corresponding to the contamination type from the multiple component types of the container component and the contamination types, predetermined cleaning procedures, and subsequent cleaning procedures in the corresponding cleaning working set stored in the storage module 300. It should be noted that, the PLC 400 such as an operation device, a processor or a microprocessor can be disposed in the dry cleaning module 100 or the inspection module 200 to perform operations and determinations, and the PLC 400 can also be disposed outside the dry cleaning module 100, the inspection module 200 or the storage module 300 and be signally connected thereto.

Figure 2:
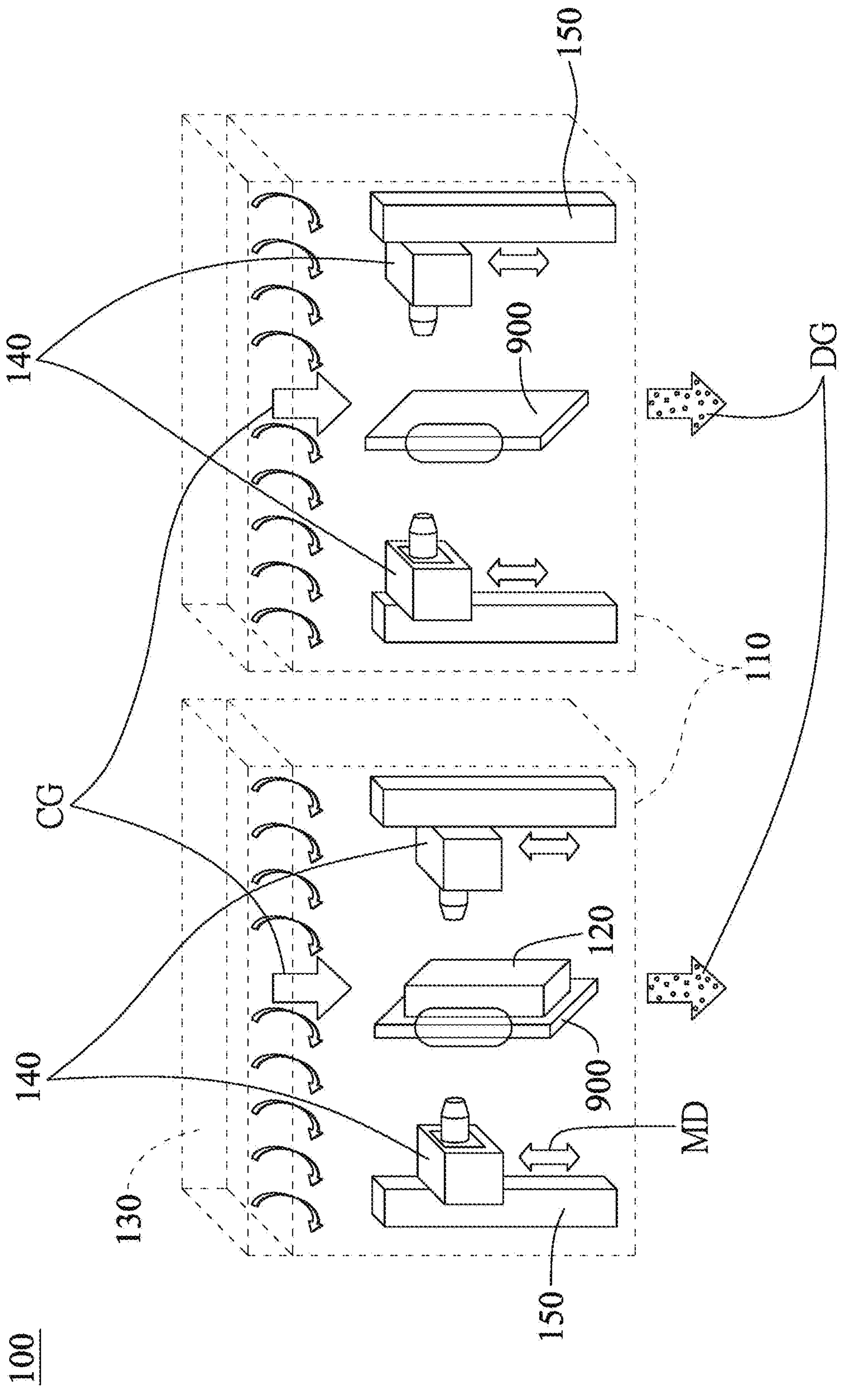
FIG. 2 is a schematic diagram of a dry cleaning module in a dry cleaning device according to an embodiment of the present disclosure.

FIG. 2 shows a schematic diagram of a dry cleaning module 100 in a dry cleaning device 10 according to an embodiment of the present disclosure. Referring to FIG. 2, in an embodiment of the present disclosure, the dry cleaning module 100 can include a cavity 110, a cleaning carrier platform 120, a filter 130, and a programmably controllable dry cleaning nozzle 140. The term "programmably controllable" refers to being controllable by the PLC 400 or by such as a program of an electronic device, an operation device, or a network device, or by an operation device such as a microprocessor of the dry cleaning module 100. The cavity 110 is adapted to accommodate a container component 900. The cleaning carrier platform 120 is adapted to carry and hold the container component 900. In an embodiment of the present disclosure, the cleaning carrier platform 120 is adapted to, for example but not limited to, fix, clamp, attract, or carry the container component 900; and the cleaning carrier platform 120 is adapted to hold the container component 900 by any desired means. The filter 130 can be, for example, a HEPA filer, which can be located over the cavity 110. A gas passes through the filter 130, becomes a filtered clean gas CG entering the cavity 110 in the form of gas flows. The container component 900 is placed in the cavity 110. The dry cleaning nozzle 140 is programmably controlled to spray carbon dioxide snowflakes to the container component 900 according to the cleaning working set so as to remove contamination or defective substances (for example, dust or impurity particles) of the container component 900. Controllable parameters of the programmably controllable dry cleaning nozzle 140 include, for example but not limited to, condition parameters such as time, flow, position, and angle. The defective substances produced from the cleaning become a dirty gas DG carrying dust after the cleaning along with gas flows of the clean gas filtered by the filter 130 and are forwarded downward and out of the cavity 110. It should be noted that, the flow directions of the gas flows are not limited to the examples shown in this embodiment. In an embodiment of the present disclosure, a plurality of dry cleaning modules 100 is provided to synchronously perform the washing process in a multiplexed manner. In an embodiment of the present disclosure, the number of the filter 130 is not limited, and can be arranged at different positions in the cavity 110 according to requirements.

In an embodiment of the present disclosure, the dry cleaning module 100 can correspondingly adjust the size and number of the cavity 110 according to different containers of a semiconductor manufacturing process or different types of container components 900, so as to be compatible with different types of containers in different sizes of a semiconductor manufacturing process or the container components 900 thereof.

In an embodiment of the present disclosure, the dry cleaning module 100 can set different cleaning procedures in the cleaning working set by the PLC 400, a microprocessor, or a user interface of the dry cleaning module 100 according to different containers of a semiconductor manufacturing process or the container components 900 thereof, so as meet characteristics or requirements of different containers or different container components 900 thereof.

In an embodiment of the present disclosure, the dry cleaning module 100 can include a plurality of dry cleaning nozzles 140 which are arranged at different angles and are disposed at different positions in the cavity 110, and the plurality of dry cleaning nozzles 140 can be controlled to rotate in different directions to clean the container component by spraying. In an embodiment of the present disclosure, the plurality of programmably controllable dry cleaning nozzles 140 can be arranged in opposite directions, for example, one group of the dry cleaning nozzles 140 is adapted to clean a first surface of the container component 900, and another group of the dry cleaning nozzles 140 is adapted to clean a second surface of the container component 900. By moving the dry cleaning nozzles 140 arranged in opposite directions, a plurality of surfaces of the container component 900 can be cleaned simultaneously.

In an embodiment of the present disclosure, the dry cleaning nozzle 140 of the dry cleaning module 100 is disposed on a programmably controllable cleaning movement module 150. The programmable control can be performed by the PLC 400, a program of an electronic device, an operation device, a network device, or by an operation device such as a microprocessor of the dry cleaning module 100 or the cleaning movement module 150. The cleaning movement module 150 is adapted to provide the dry cleaning nozzle 140 with a movement in a three-dimensional space within the cavity 110, so that the dry cleaning nozzle 140 can be programmably controlled to move to different positions, distances, and angles for cleaning, and to have a relative position relationship that can be freely adjusted. The movement direction MD shown by the arrows is merely an example. In an embodiment of the present disclosure, the dry cleaning nozzle 140 moves on the cleaning movement module 150. In an embodiment of the present disclosure, the dry cleaning nozzle 140 moves along with the cleaning movement module 150. In an embodiment of the present disclosure, the dry cleaning nozzle 140 can move on the cleaning movement module 150 and move along with the cleaning movement module 150. In an embodiment, the cleaning movement module 150 can be in the form of, for example but not limit to, a slide, a pulley, an automation arm, a telescopic mechanism, or a micro self-propelled vehicle.

Figure 3A:
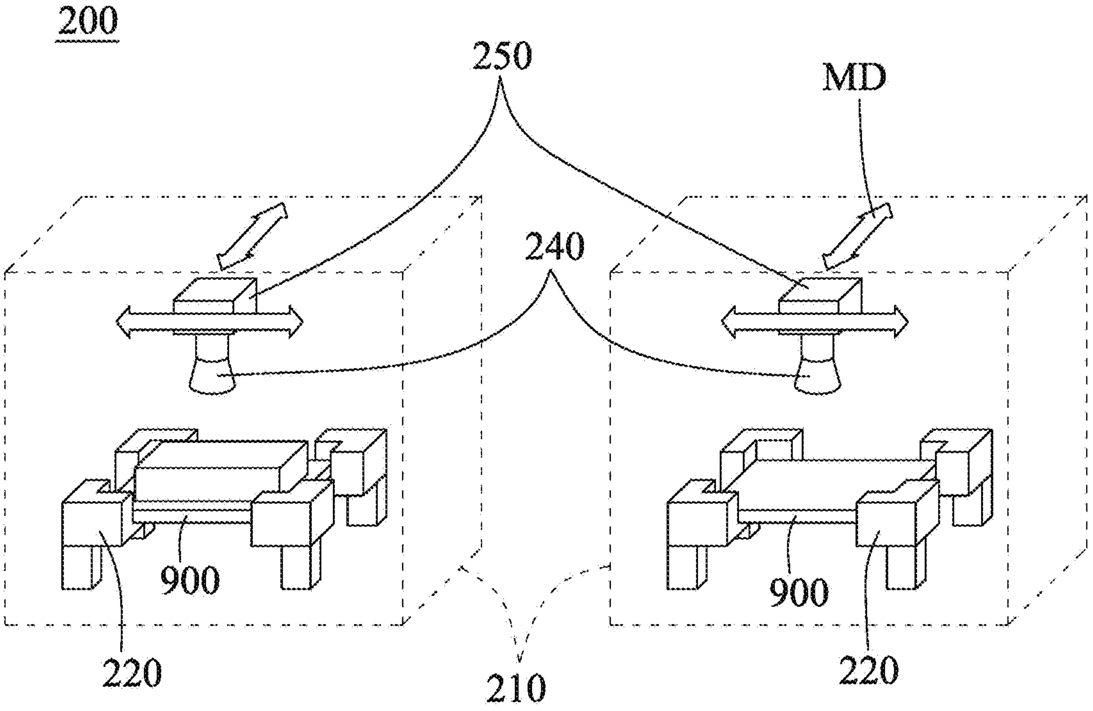
FIG. 3A is a schematic diagram of an inspection module in a dry cleaning device according to an embodiment of the present disclosure.
Figure 3B:
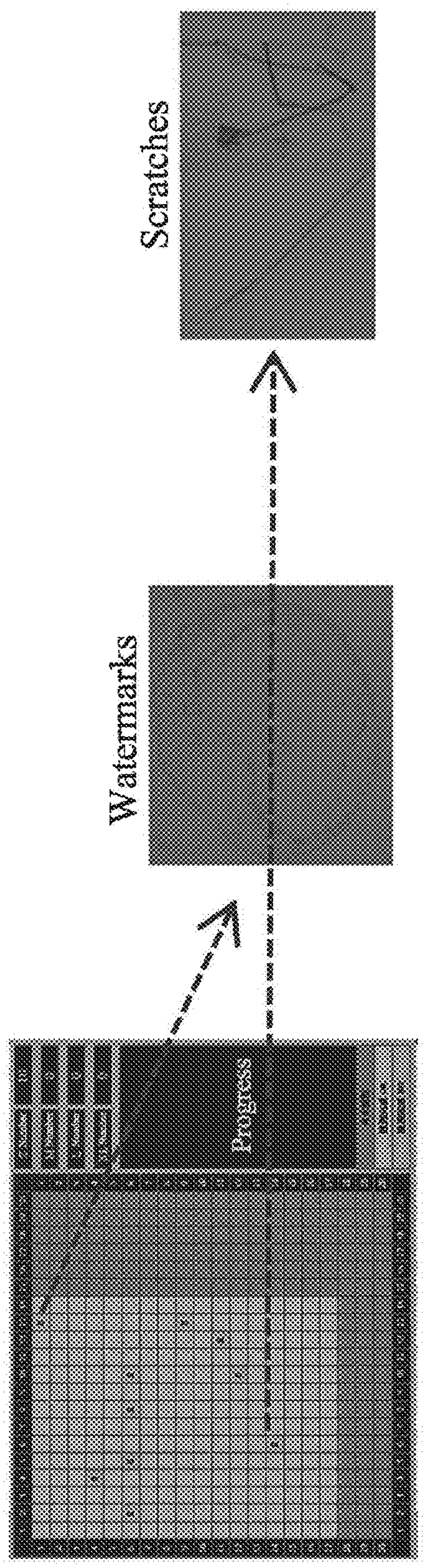
FIG. 3B is a schematic diagram of a region divided into a mesh pattern by an inspection module of a dry cleaning device and contamination types labeled according to an embodiment of the present disclosure.

FIG. 3A shows a schematic diagram of the inspection module 200 of the dry cleaning device 10 according to an embodiment of the present disclosure. FIG. 3B shows a schematic diagram of an illustrative aspect of an inspection result obtained by the inspection module 200 of the dry cleaning device 10 according to an embodiment of the present disclosure. A region of the container component can be divided into a mesh pattern and contamination types labeled, wherein the inspection module 200 or the PLC 400 connected thereto displays the inspection result by a user interface or another electronic device. Referring to FIG. 3A, in an embodiment of the present disclosure, the inspection module 200 can include a cavity 210, an inspection carrier platform 220, an inspection lens 240, and an inspection analyzer (not shown). The inspection lens 240 is programmably controlled, and the inspection module 200 is adapted to inspect the container component 900. The term "programmably controllable" refers to being controllable by the PLC 400, a program of an electronic device, an operation device, a network device, or by an operation device such as a microprocessor of the inspection module 200. The inspection analyzer is adapted to analyze a condition of the container component after the inspecting to accordingly obtain an inspection result. The condition of the container component includes, for example but not limited to, appearance inspection before the cleaning or after the cleaning, the component type and the component size of the container component (that is, a cleaning target) before the cleaning, and/or the type, level, number, and region of contamination of the container component after the cleaning. For example, before the cleaning, the inspection module 200 can inspect the container component to determine the component type to obtain an inspection result indicating the type of the container and the type of the component by the inspection analyzer, and the PLC 400 can accordingly select the predetermined cleaning procedure of the corresponding type of the container component, and control the dry cleaning module 100 to perform the cleaning according to the corresponding predetermined cleaning procedure. The cavity 210 is adapted to accommodate the container component 900. The inspection carrier platform 220 is adapted to carry and hold the container component 900, in a manner the same as that of the cleaning carrier platform 120. The cavity 210 of the inspection module 200 can be a cavity the same as or different from the cavity 110 of the dry cleaning module 100. Referring to FIG. 3B, in an embodiment of the present disclosure, the inspection module 200 or the PLC 400 connected thereto can display the inspection result by a user interface, an electronic device, or a display module (for example, a screen or a control panel), and a region of the container component 900 can be divided into a mesh pattern. In an embodiment of the present disclosure, the inspection module 200 or the PLC 400 divides the region of the container component 900 into a mesh pattern, and labels types of contamination (types of defects) thereof, for example, labeling a watermark region or a scratched region. The dividing of the region of the container component into a mesh pattern and the labeling of the types of contamination can be identifying a region with contamination according to, for example, profile characteristics, graphic shapes, grayscale change characteristics, predetermined reference characteristics, and predetermined thresholds of contamination types, and labeling the region with contamination and labeling the contamination type thereof according to a predetermined or dynamic standard or condition. For example, when a partial region contains a linear grayscale change having slender and elongated profile characteristics, such may be a scratched type, and the region containing the above is labeled. In an embodiment of the present disclosure, the inspection lens 240 is an optical lens. In an embodiment of the present disclosure, the inspection module 200 can be plural in number for synchronous inspection in a multiplexed manner. In an embodiment of the present disclosure, a plurality of inspection lens 240 is provided so as to perform inspection from different positions and angles, and different inspection positions, inspection angles, inspection times, and inspection modes can manually or automatically controlled by the programmable control above.

In an embodiment of the present disclosure, the inspection lens 240 of the inspection module 200 is disposed on a programmably controllable inspection movement module 250. Similar to the programmable control above, the inspection movement module 250 is adapted to allow the inspection lens 240 to move in a three-dimensional space within the cavity 210, such that inspection lens 240 is capable of moving to different positions, distances, and angles by the programmable control to perform inspection, and have a relative position relationship that can be freely adjusted. The movement direction MD shown by the arrows is merely an example.

In an embodiment of the present disclosure, the inspection lens 240 moves on the inspection movement module 250. In an embodiment of the present disclosure, the inspection lens 240 moves along with the inspection movement module 250. In an embodiment of the present disclosure, the inspection lens 240 can move on the inspection movement module 250 and also move along with the inspection movement module 250.

In an embodiment of the present disclosure, the inspection movement module 250 and the cleaning movement module 150 are a same shared mechanism.

In an embodiment of the present disclosure, the inspection movement module 250 and the cleaning movement module 150 are mechanisms operating separately. It should be noted that, the dry cleaning module 100 and the inspection module 200 can be controlled by the PLC 400. Alternatively, the PLC 400 such as a processor, a microprocessor, or an operation device can be disposed in the dry cleaning module 100 or the inspection module 200, so as to complete the functions of determinations, operations, program control, outputting results, and receiving inputs via a user interface by the dry cleaning module 100 or the inspection module 200 itself.

Figure 4:
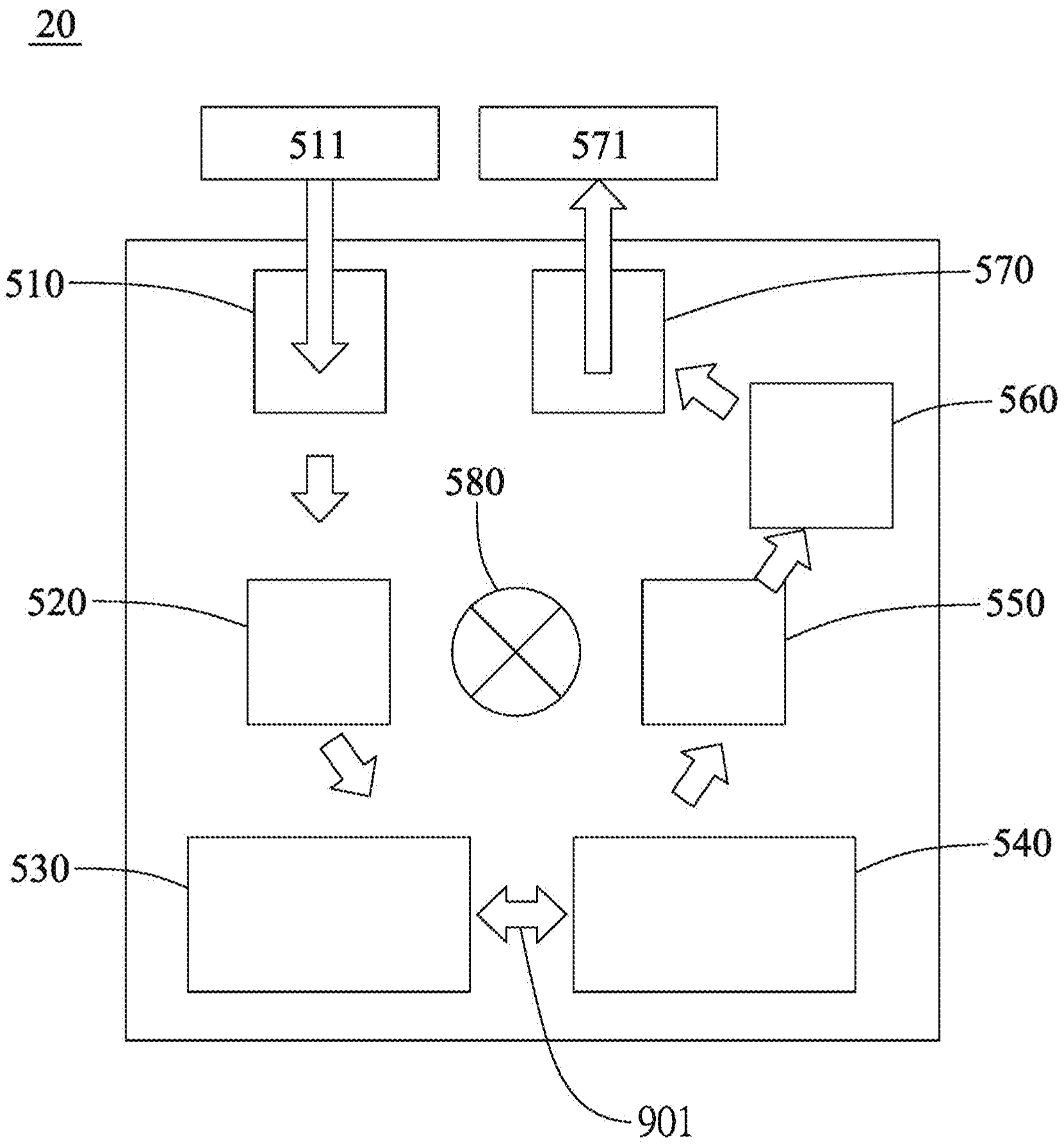
FIG. 4 is a block schematic diagram of a dry cleaning device according to an embodiment of the present disclosure.

FIG. 4 shows a block schematic diagram of a dry cleaning device according to an embodiment of the present disclosure. Referring to FIG. 4, in an embodiment of the present disclosure, a dry cleaning device 20 further includes a feed module 510, a disassembly module 520, an inspection module 530, a dry cleaning module 540, an assembly module 550, a continuous inflation module 560, a discharge module 570, and a transport module 580. The arrows represent a transmission path 901 of a container of a semiconductor manufacturing process and/or a container component thereof. The inspection module 530 and the dry cleaning module 540 are the same as those described above, and so associated details thereof are omitted herein.

The feed module 510 is adapted to import a container of a semiconductor manufacturing process into the dry cleaning device 20, that is, a container importer 511. The container of a semiconductor manufacturing process is, for example, a wafer carrier pod, a mask carrier pod, or a carrier board carrier pod. In an embodiment of the present disclosure, a plurality of feed modules 510 can be provided for synchronous operations in a multiplexed manner. The disassembly module 520 is adapted to disassemble the container of a semiconductor manufacturing process into a plurality of container components 900, for example, disassembling a mask carrier pod or a wafer carrier pod into container components such as a cover, a base, a carrier platform, or parts. In an embodiment of the present disclosure, a plurality of disassembly modules 520 is provided for synchronous operations in a multiplexed manner. The assembly module 550 is adapted to assemble the container components 900 which have been dry cleaned by the dry cleaning module 540 into a container. For example, mask/wafer carrier pod components which have been dry cleaned are assembled into a mask/wafer carrier pod.

In an embodiment of the present disclosure, a plurality of assembly modules 550 can be provided for synchronous operations in a multiplexed manner. The continuous inflation module 560 is adapted to continuously inflate the containers that have been assembled, for example, to eliminate moisture so as to keep the inside of the container dry, or to fill with a low-reactive gas for facilitating the use of storing semiconductor elements.

In an embodiment of the present disclosure, a plurality of continuous inflation modules 560 can be provided for synchronous operations in a multiplexed manner. The discharge module 570 is adapted to export a container of a semiconductor manufacturing process out of the dry cleaning device 20, that is, a container exporter 571.

In an embodiment of the present disclosure, a plurality of discharge modules 570 is provided for synchronous operations in a multiplexed manner. The transport module 580 is adapted to move the container of a semiconductor manufacturing process or the disassembled container components 900 in the dry cleaning device 20.

In an embodiment of the present disclosure, the transport module 580 can be an automation arm, or, for example, a conveyor belt or a conveyor carrier platform. In an embodiment of the present disclosure, a plurality of transport modules 580 is provided for synchronous operations in a multiplexed manner.

A dry cleaning method adapted for a dry cleaning device to clean a container of a semiconductor manufacturing process and/or a container component thereof is further disclosed according to another aspect of the present disclosure.

Figure 5:
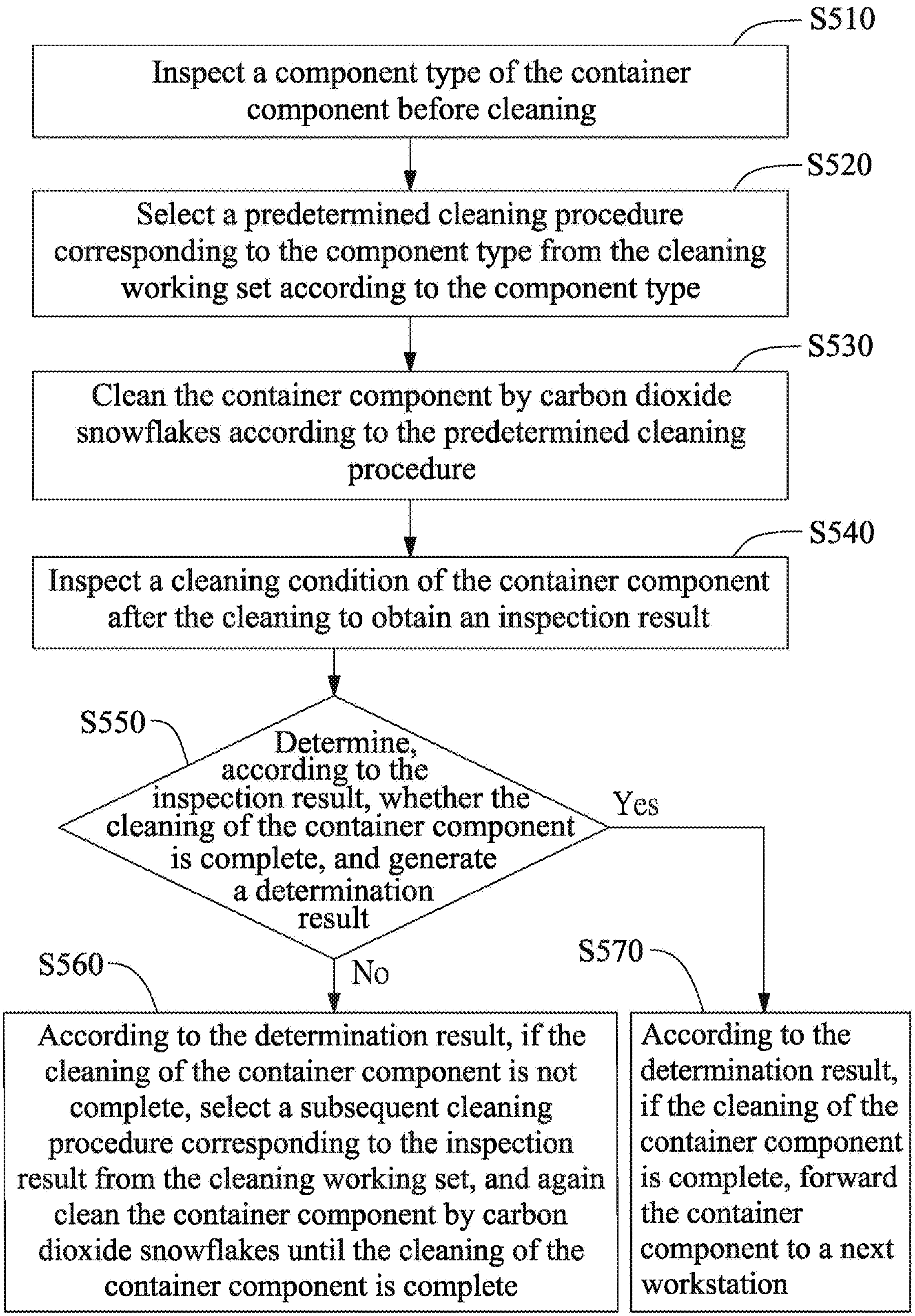
FIG. 5 is a flowchart of a dry cleaning method according to an embodiment of the present disclosure.

Referring to FIG. 1 and FIG. 5, FIG. 5 shows a flowchart of a dry cleaning method according to an embodiment of the present disclosure. The dry cleaning method according to an embodiment of the present disclosure is adapted for a dry cleaning device to clean a container component of a container of a manufacturing process. The dry cleaning device 10 includes the dry cleaning module 100, the inspection module 200, and the storage module 300. The storage module 300 stores the cleaning working set corresponding to the container component. The dry cleaning method includes: in step S510 inspecting a component type of the container component before cleaning; in step S520 selecting a predetermined cleaning procedure corresponding to the component type from the cleaning working set according to the component type; in step S530 cleaning the container component by carbon dioxide snowflakes according to the predetermined cleaning procedure; in step S540 inspecting a cleaning condition of the container component after the cleaning to obtain an inspection result; in step S550 determining, according to the inspection result, whether the cleaning of the container component is complete, and generating a determination result; in step S560 according to the determination result, if it is determined in step S550 that the cleaning of the container component is not complete, selecting a subsequent cleaning procedure corresponding to the inspection result from the cleaning working set, and again cleaning the container component with carbon dioxide snowflakes until the cleaning of the container component is complete, and if it is determined according to the determination result in step S550 that the cleaning of the container component is complete, performing step S570 of forwarding the container component to a next station.

In an embodiment of the present disclosure, the determining of whether the cleaning of the container component is complete includes dividing a region of the container component into a mesh pattern by an artificial intelligence (AI) inspection engine, labeling a defective substance quantity of the region, and comparing the defective substance quantity with a predetermined inspection standard to accordingly generate the determination result.

In an embodiment of the present disclosure, before the inspecting of the component type of the container component before the cleaning, the method further includes: storing multiple component types of the container component and contamination types, predetermined cleaning procedures, and subsequent cleaning procedures in the corresponding cleaning working set.

In an embodiment of the present disclosure, the inspecting of the container component before the cleaning and after the cleaning includes determining the component type and/or the contamination type by a programmable logic controller (PLC) according to the inspection result before the cleaning and after the cleaning, and selecting the predetermined cleaning procedure or the subsequent cleaning procedure corresponding to the component type and/or the contamination type.

In an embodiment of the present disclosure, the dry cleaning method can be performed by the dry cleaning device above.

Figure 6:
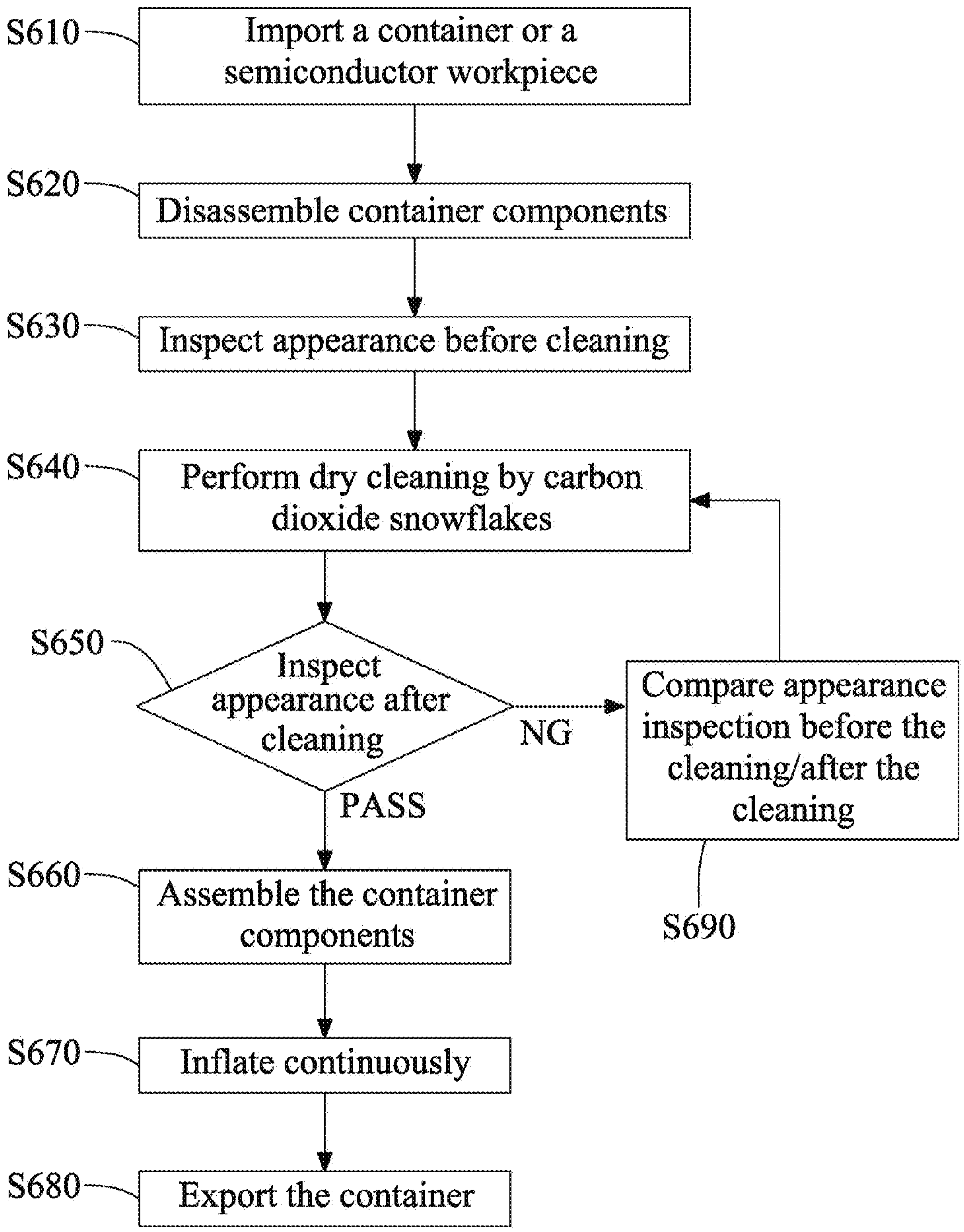
FIG. 6 is a flowchart of an application of a dry cleaning method according to an embodiment of the present disclosure.

FIG. 6 shows a flowchart of an application of a dry cleaning method to a process of a container or a semiconductor workpiece according to an embodiment of the present disclosure. A dry cleaning method according to an embodiment of the present disclosure includes: in step S610 importing a container or a semiconductor workpiece; in step S620 disassembling container components; in step S630 inspecting appearance before cleaning; in step S640 performing dry cleaning by carbon dioxide snowflakes; in step S650 inspecting appearance after cleaning; in step S660 assembling the container components; in step S670 inflating continuously; in step S680 exporting the container; and in step S690 comparing appearance inspection before the cleaning/after the cleaning.

Referring to FIG. 6, first of all, the container of a semiconductor manufacturing process is disassembled into container components by the disassembly module, and transported by the transport module to the inspection module to perform appearance inspection before the cleaning. For example, the appearances, types, and sizes of the container components are inspected to determine types of the container components and/or conditions of contamination before the cleaning. After the inspection, the container components are transported to the dry cleaning module by the transport module and cleaned by carbon dioxide snowflakes to remove defective substances on the container components, and then transported by the transport module to the inspection module for appearance inspection after the cleaning, so as to determine whether the conditions of contamination after the cleaning meet cleaning standards. If the appearance inspection after the cleaning does not qualify (NG), the inspection module can compare the appearance inspection results before the cleaning and after the cleaning, and transport the container components to the dry cleaning module, so as to again clean a contaminant residue region containing defective substances inspected, or perform strengthened cleaning on a specific region or contamination type, that is, step S690 is performed. If the appearance inspection after the cleaning qualifies (PASS), the container components are forwarded to a next workstation, for example, to perform other subsequent processes after the cleaning. In an embodiment of the present disclosure, the container components are transported by the transport module to the assembly module for assembly, and are transported by the transport module to the discharge module after inflation is performed by the continuous inflation module, so as to export the container components out of the dry cleaning device.

In an embodiment of the present disclosure, the inspection module determines according to a predetermined inspection standard whether the appearance inspection after the cleaning qualifies. For example, an exemplary inspection standard is that, it is determined that the appearance inspection after the cleaning does not qualify when the number of defective substances per unit area is greater than a predetermined standard, and it is determined that the appearance inspection after the cleaning qualifies when the number of defective substances per unit area is less than the predetermined standard.

In an embodiment of the present disclosure, if the appearance inspection after the cleaning does not qualify, after comparing the appearance inspection results before the cleaning and after the cleaning, the inspection module reads a corresponding subsequent cleaning procedure from a storage module, for example, a database, by a PLC, and cleaning with carbon dioxide snowflakes of the subsequent cleaning procedure is performed by the dry cleaning module.

In an embodiment of the present disclosure, the storage module (for example, a database) stores washing processes and cleaning procedures corresponding to multiple different contamination types (for example, different types of defective substances), so as to determine contamination types for different appearance inspection results, and to select subsequent cleaning procedures corresponding to the different contamination types (for example, different types of defective substances), so as to select an appropriate subsequent cleaning procedure for a specific type of defect.

In an embodiment of the present disclosure, the storage module (for example, a database) stores washing processes and cleaning procedures corresponding to different contamination types, different contamination areas, and different contamination numbers. In an embodiment of the present disclosure, cleaning parameters in the multiple washing processes and cleaning procedures in the cleaning working set include, for example but not limited to, cleaning time, cleaning distance, flow speed of carbon dioxide snowflakes, movement speed of the carbon dioxide snowflakes nozzle, and movement path of the carbon dioxide snowflakes nozzle, so as to perform cleaning for different contamination types, different contamination levels, and different contamination areas.

In an embodiment of the present disclosure, the contamination types of the container components include, for example but not limited to, watermarks, contamination marks, scratches, imprints, and particles. In an embodiment of the present disclosure, the defective substances include, for example but not limited to, carbon-containing, oxygen-containing, metal-containing, and silicon containing compounds.

In an embodiment of the present disclosure, according to the appearance inspection result after the cleaning and/or comparison of appearance inspection results before the cleaning and after the cleaning, the PLC can feed back and adjust the corresponding washing processes, cleaning procedures, and/or the cleaning parameters thereof in the cleaning working set in the storage module (for example, a database), so as to optimize the washing processes, cleaning procedures, and/or the cleaning parameters corresponding to different appearance inspection results and to perform automatic adjustment for parameters of washing processes and cleaning procedures corresponding to different contamination types. The washing processes and cleaning procedures can include the predetermined cleaning procedures and subsequent cleaning procedures described above, and the substantial cleaning details and parameters of the predetermined cleaning procedures and subsequent cleaning procedures can be common, and the parameters of the predetermined cleaning procedures and subsequent cleaning procedures are not necessarily specifically differentiated.

In an embodiment of the present disclosure, the PLC further includes an artificial intelligence (AI) determination engine for adjusting the cleaning working set in the storage module according to the inspection result, so as to automatically feed back, adjust, and optimize washing processes, cleaning procedures, and/or cleaning parameters in the cleaning working set. For example, when a corner of a component after cleaning still contains a contamination impurity, cleaning on the corner can be strengthened by adjusting and strengthening the cleaning working set.

In an embodiment of the present disclosure, the inspection module further includes an AI inspection engine, so as to automatically adjust and optimize analysis and determination of contamination types by a machine learning model or a depth learning model according to different appearance inspection results.

In an embodiment of the present disclosure, analysis standards of the contamination types can be fed back and updated to the inspection module and/or the storage module (a database, for example) by a machine learning model or a deep learning model, so as to optimize the standard for determining the contamination types.

In an embodiment of the present disclosure, the operation of the inspection module can be performed by a PLC. In another embodiment of the present disclosure, the operation of the PLC can be performed by the inspection analyzer or the AI inspection engine of the inspection module. In yet another embodiment of the present disclosure, the PLC is included in the inspection module.

Figure 7:
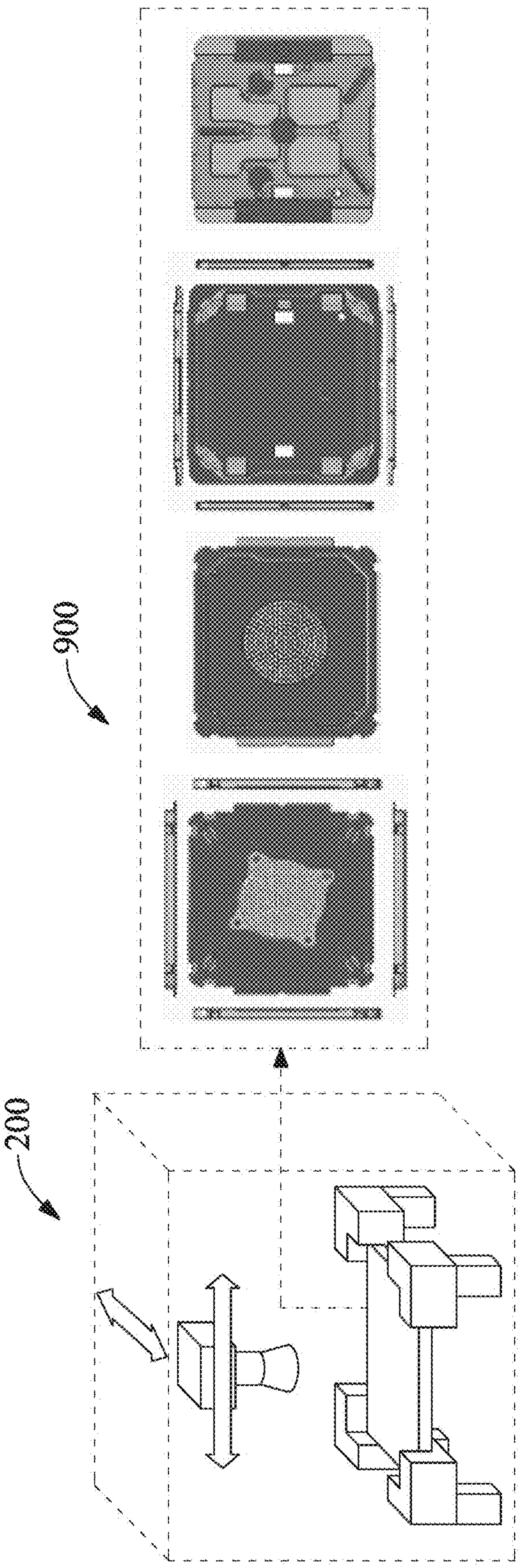
FIG. 7 is an illustrative schematic diagram of a dry cleaning device adapted to inspect different container components according to an embodiment of the present disclosure.

FIG. 7 shows an illustrative schematic diagram of a dry cleaning device adapted to inspect different container components according to an embodiment of the present disclosure. Refer to FIG. 7 showing a schematic diagram of an inspection module inspecting different container components of container components in an embodiment of the present disclosure, for example, container components including a cover, a base, a carrier platform, and parts.

In an embodiment of the present disclosure, the inspection module can predetermine different inspection regions for different container components, for example, setting different inspection regions of interest (ROI) for different container components.

Figure 8:
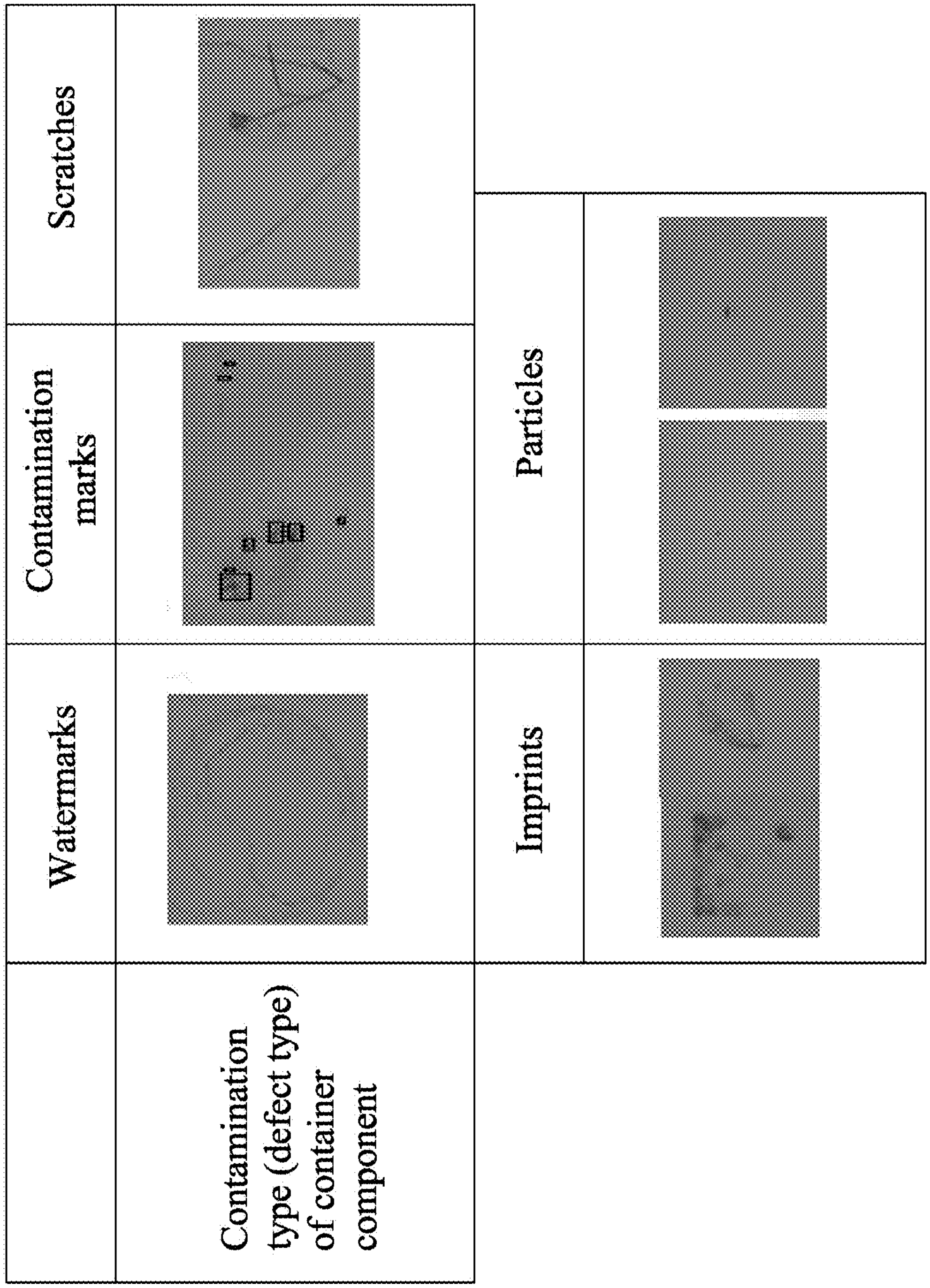
FIG. 8 is an illustrative schematic diagram of different contamination types stored in a dry cleaning device according to an embodiment of the present disclosure.

FIG. 8 shows an illustrative schematic diagram of different contamination types stored in a dry cleaning device according to an embodiment of the present disclosure. Refer to FIG. 8 showing a diagram of illustrative defective types of container components of different contamination types (for example, different types of defective substances) stored in the inspection module and/or the database in an embodiment of the present disclosure. The contamination types of the container components include, for example but not limited to, watermarks, contamination marks, scratches, imprints, and particles.

Figure 9A:
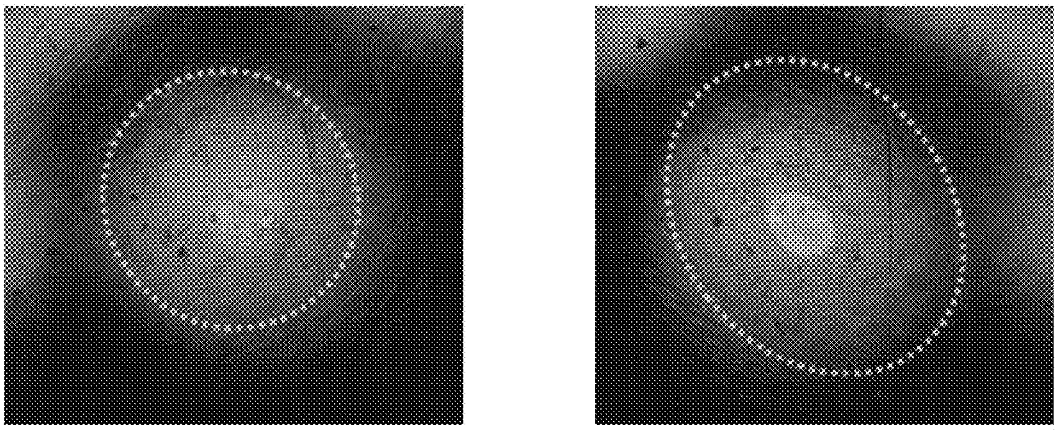
FIG. 9A is an illustrative schematic diagram of a surface of a container component before dry cleaning according to an embodiment of the present disclosure.
Figure 9B:
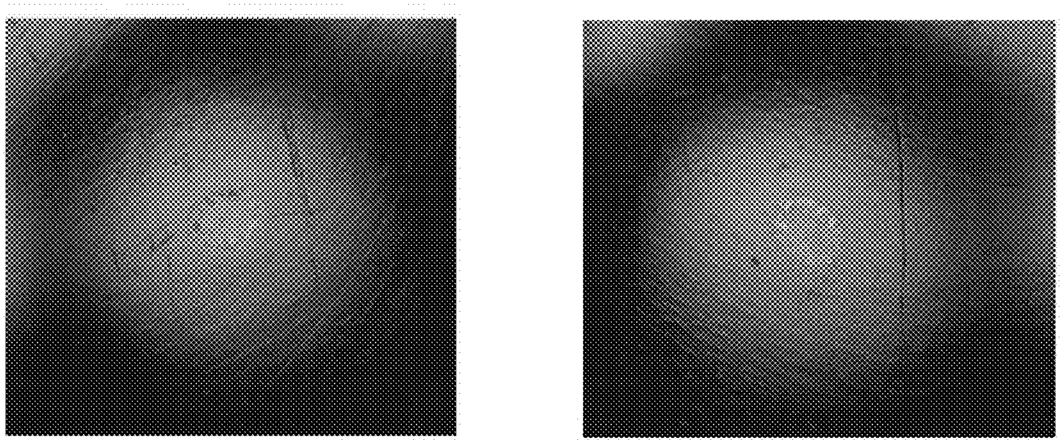
FIG. 9B is an illustrative schematic diagram of a surface of a container component after dry cleaning according to an embodiment of the present disclosure.

FIG. 9A shows an illustrative schematic diagram of a surface of a container component before dry cleaning according to an embodiment of the present disclosure. FIG. 9B shows an illustrative schematic diagram of a surface of a container component after dry cleaning according to an embodiment of the present disclosure. Referring to FIG. 9A showing a schematic diagram of two different regions on a surface of a container component before dry cleaning, it is visible within the dotted lines that contamination substances reside on the surface of the container component. Referring to FIG. 9B showing a schematic diagram of two regions the same as those in FIG. 9A on a surface of a container component after dry cleaning, it is visible within the same regions that contamination substances originally existing on the surface of the container component are removed by the dry cleaning.

Thus, with the dry cleaning device or dry cleaning method of the present disclosure, a fast and effective dry cleaning device and method free from the use of liquid solvents can be implemented, so as to meet cleaning requirements of a large quantity of containers of a semiconductor manufacturing process and to reduce the use of liquid solvents and manufacturing process operation time. With the dry cleaning device and dry cleaning method of the present disclosure, since liquid solvents are not needed, the use of a large amount of deionized (DI) water can be eliminated so that a large amount of waste water is not produced. Moreover, compared with a conventional washing process that requires steps of washing, drying, and baking, the dry cleaning device or dry cleaning method of the present disclosure involves only the step of dry cleaning. In addition to saving manufacturing process time, material, and part costs of the cleaning device, development and assembly time of the device and an occupied ground area of the device are all reduced, hence further enhancing effects and quality of the necessary container washing processes in semiconductor manufacturing processes.

The present disclosure is described by way of the preferred embodiments above. A person skilled in the art should understand that, these embodiments are merely for describing the present disclosure and are not to be construed as limitations to the scope of the present disclosure. It should be noted that all equivalent changes, replacements, and substitutions made to the embodiments are encompassed within the scope of the present disclosure. Therefore, the legal protection for the present disclosure should be defined by the appended claims and be in accordance with the broadest interpretation of the claims, so as to encompass all modifications and similar arrangements and processes.

While the present disclosure has been described by means of specific embodiments, numerous modifications and variations could be made thereto by those skilled in the art without departing from the scope and spirit of the present disclosure set forth in the claims.

What is claimed is:

1. A dry cleaning device, adapted to clean a container component of a container of a semiconductor manufacturing process, the dry cleaning device comprising:

a dry cleaning module, adapted to clean the container component by carbon dioxide snowflakes;

an inspection module, adapted to inspect the container component to obtain a pre-cleaning inspection result and a post-cleaning inspection result;

a storage module, adapted to store the container component and a corresponding cleaning working set;

a programmable logic controller (PLC), signally connected to the dry cleaning module, the inspection module and the storage module, the PLC adapted to perform steps of:

cleaning the container component with carbon dioxide snowflakes by the dry cleaning module according to the cleaning working set;

inspecting the container component before the cleaning and after the cleaning by the inspection module to obtain the pre-cleaning inspection result and the post-cleaning inspection result;

determining a component type of the container component according to a container and component type for the container component in the pre-cleaning inspection result before the cleaning, selecting a predetermined cleaning procedure corresponding to the component type from the cleaning working set according to the component type, and cleaning the container component by carbon dioxide snowflakes by the dry cleaning module according to the predetermined cleaning procedure;

determining, according to the post-cleaning inspection result after the cleaning, whether the cleaning of the container component is complete, and generating a determination result; and selecting a subsequent cleaning procedure corresponding to the post-cleaning inspection result from the cleaning working set according to the determination result, and cleaning the container component by carbon dioxide snowflakes by the dry cleaning module according to the subsequent cleaning procedure, or forwarding the container component to a next workstation.

2. The dry cleaning device according to claim 1, wherein the dry cleaning module comprises:

a cavity;

a cleaning carrier platform, disposed in the cavity, the cleaning carrier platform adapted to hold the container component;

a filter, disposed in the cavity, the filter adapted to filter a gas for a clean gas to flow into the cavity; and a dry cleaning nozzle, disposed in the cavity, the dry cleaning nozzle spraying carbon dioxide snowflakes to the container component according to the cleaning working set.

3. The dry cleaning device according to claim 2, wherein a plurality of dry cleaning nozzles are provided, the plurality of dry cleaning nozzles are arranged at different positions in the cavity, and the dry cleaning nozzles are controllable to rotate in different directions to clean the container component.

4. The dry cleaning device according to claim 2, wherein the dry cleaning module further comprises a cleaning movement module, and the PLC controls the cleaning movement module to adjust a relative position relationship between the dry cleaning nozzle and the container component.

5. The dry cleaning device according to claim 1, wherein the inspection module comprises:

an inspection carrier platform, adapted to carry the container component;

an inspection lens, adapted to inspect the container component; and an inspection analyzer, adapted to analyze a condition of the container component after the inspecting to accordingly obtain the pre-cleaning inspection result and the post-cleaning inspection result.

6. The dry cleaning device according to claim 5, wherein the inspection module further comprises an inspection movement module, and the PLC is for controlling the inspection movement module to adjust a relative position relationship between the inspection lens and the container component.

7. The dry cleaning device according to claim 5, wherein the inspection module further comprises an AI inspection engine, and the pre-cleaning inspection result and the post-cleaning inspection result are obtained by processing of the AI inspection engine.

8. The dry cleaning device according to claim 1, wherein the PLC divides a region of the container component into a mesh pattern according to the pre-cleaning inspection result before the cleaning or the post-cleaning inspection result after the cleaning, and labels a contamination type.

9. The dry cleaning device according to claim 1, wherein the PLC determines whether the cleaning is complete by comparing a defective substance quantity within a unit area in the post-cleaning inspection result after the cleaning with a predetermined inspection standard.

10. The dry cleaning device according to claim 1, wherein the PLC obtains the subsequent cleaning procedure for strengthening regional cleaning from the cleaning working set according to the post-cleaning inspection result after the cleaning.

11. The dry cleaning device according to claim 1, wherein the storage module has a plurality of component types of the container component and contamination types, predetermined cleaning procedures and subsequent cleaning procedures in the corresponding cleaning working set stored therein; the PLC determines the component type and the contamination type according to the pre-cleaning inspection result before the cleaning, or according to the post-cleaning inspection result after the cleaning, and selects the predetermined cleaning procedure corresponding to the contamination type in the pre-cleaning inspection result or the subsequent cleaning procedure corresponding to the contamination type in the post-cleaning inspection result.

12. The dry cleaning device according to claim 1, wherein the PLC provides feedback and adjusts the cleaning working set in the storage module according to the pre-cleaning inspection result and the post-cleaning inspection result, wherein the cleaning working set comprises the predetermined cleaning procedure and the subsequent cleaning procedure.

13. The dry cleaning device according to claim 12, wherein the PLC further comprises an artificial intelligence (AI) determination engine for updating the cleaning working set in the storage module according to the pre-cleaning inspection result and the post-cleaning inspection result.

* * * * *